United States Patent [19]

Yamaguchi et al.

[11] Patent Number: 4,625,499
[45] Date of Patent: Dec. 2, 1986

[54] DEVICE FOR LOADING PRODUCTS TO A PREDETERMINED LOCATION

[75] Inventors: Yoshimitsu Yamaguchi; Masanori Suzuki, both of Kariya; Tadahiko Shibata, Nukata, all of Japan

[73] Assignee: Nippondenso Co., Ltd., Kariya, Japan

[21] Appl. No.: 751,237

[22] Filed: Jul. 2, 1985

[30] Foreign Application Priority Data

Jul. 6, 1984 [JP] Japan .............................. 59-138970

[51] Int. Cl.⁴ .......................................... B65B 35/30
[52] U.S. Cl. ...................................... 53/542; 198/425; 198/663; 414/107
[58] Field of Search .................. 53/542; 198/425, 462, 198/663; 271/179; 414/107

[56] References Cited

U.S. PATENT DOCUMENTS

| | | | |
|---|---|---|---|
| 723,392 | 3/1903 | Jungbecker | 196/663 X |
| 849,122 | 4/1907 | George | 198/663 |
| 2,778,638 | 1/1957 | Whillock | 271/179 |
| 3,000,151 | 9/1961 | Winkler | 53/542 X |
| 3,435,584 | 4/1969 | Prechter | 53/542 X |

FOREIGN PATENT DOCUMENTS

| | | | |
|---|---|---|---|
| 1476915 | 3/1967 | France | 198/425 |
| 2259769 | 8/1975 | France | 198/425 |
| 49-3581 | 1/1974 | Japan . | |

*Primary Examiner*—John Sipos
*Attorney, Agent, or Firm*—Cushman, Darby & Cushman

[57] ABSTRACT

A loading device including a frame, a stopper provided along the path through which the products are fed to the predetermined location, a threaded column supported in the frame and rotating in such a manner that the upper surfaces of the threads thereof move clockwise in a direction toward the stopper, a motor rotating the threaded column, and a conveyer supplying the product to the threaded column in such a manner that the product is engaged with the portion between the screw threads. The threaded column has external screw threads turning in a direction toward the predetermined location when the threaded column rotates. The portion between the screw threads receives the product to urge the product along by frictional force from the rotation of the threaded column until the end of the product butts against the stopper. This portion also feeds the product to the predetermined location while urging the end of the product against the stopper.

5 Claims, 9 Drawing Figures

|   | 16 | 15 | 14 | 13 | 12 | 11 | 10 | 9 | 8 | 7 | 6 | 5 | 4 | 3 | 2 | 1 |
|---|----|----|----|----|----|----|----|---|---|---|---|---|---|---|---|---|
| a | 0 | 0 | 0 | 0 | 0 | 0 | 0 | 0 | 0 | 0 | 0 | 0 | 0 | 0 | 0 | 1 |
| b | 0 | 0 | 0 | 0 | 0 | 0 | 0 | 0 | 0 | 0 | 0 | 0 | 0 | 0 | 1 | 0 |
| c | 0 | 0 | 0 | 0 | 0 | 0 | 0 | 0 | 0 | 0 | 0 | 0 | 0 | 1 | 0 | 0 |
| d | 0 | 0 | 0 | 0 | 1 | 0 | 0 | 0 | 0 | 0 | 0 | 1 | 0 | 0 | 0 | 0 |
| e | 0 | 0 | 0 | 1 | 0 | 0 | 0 | 0 | 0 | 0 | 1 | 0 | 0 | 0 | 1 | 1 |
| f | 0 | 0 | 1 | 0 | 0 | 0 | 0 | 0 | 0 | 1 | 0 | 0 | 0 | 1 | 1 | 0 |
| g | 0 | 1 | 0 | 0 | 0 | 0 | 0 | 0 | 1 | 0 | 0 | 0 | 1 | 0 | 0 | 0 |
| h | 1 | 0 | 0 | 0 | 0 | 0 | 0 | 1 | 0 | 0 | 0 | 1 | 0 | 0 | 0 | 0 |
| i | 0 | 0 | 0 | 0 | 0 | 0 | 1 | 0 | 0 | 0 | 1 | 0 | 0 | 0 | 0 | 0 |
| j | 0 | 0 | 0 | 0 | 0 | 1 | 0 | 0 | 0 | 1 | 0 | 0 | 0 | 0 | 0 | 0 |
| k | 0 | 0 | 0 | 0 | 1 | 0 | 0 | 0 | 1 | 0 | 0 | 0 | 0 | 0 | 0 | 0 |
| l | 0 | 0 | 0 | 1 | 0 | 0 | 0 | 1 | 0 | 0 | 0 | 0 | 0 | 0 | 0 | 0 |
| m | 0 | 0 | 1 | 0 | 0 | 0 | 1 | 0 | 0 | 0 | 0 | 0 | 0 | 0 | 0 | 0 |
| n | 0 | 0 | 1 | 0 | 0 | 0 | 1 | 0 | 0 | 0 | 0 | 0 | 0 | 0 | 0 | 0 |

DEVICE FOR LOADING PRODUCTS TO A PREDETERMINED LOCATION

BACKGROUND OF THE INVENTION

1. Field of the Invention

The present invention relates to a device for loading products to a predetermined location after the ends of the products are trued-up, the products having a constant length and being, for example, tubes which are used for the cores of a radiator or heater of an automobile.

2. Description of the Related Art

A conventional loading device as shown in Japanese Examined Utility Model Publication No. 49-3581 has a feeder continually feeding products along a first path, a stocker having a pair of guide plates forming a second path, which is at a right angle to the first path, a projecting member provided at an intersection point of the first and second paths, and a cam engaging with the projecting member so that the projecting member swings in the direction of the second path. The products fed by the feeder are pushed by the projecting member to enter the stocker, the guide plates of which true up the ends of the products. In this device, the projecting member must periodically swing to feed the products into the stocker one by one, and the timing of the swing of the projecting member is decided by the length of the products. However, if the length of the products is changed, the cam must be adjusted to change the timing of the swing of the projecting member. This adjustment can be carried out only after suspending the operation of the loading device. Therefore, taking into consideration the frequency at which the length of the products is changed, the conventional loading device lacks a high operational efficiency. Further, the conventional loading device cannot easily true up the ends of the products when the products are fed from the former process at a rate of more than 50 m/min.

SUMMARY OF THE INVENTION

An object of the present invention is to provide a device for loading products to a predetermined location, the operation of which device does not need to be suspended when changing the length of the products to be fed.

Another object of the present invention is to provide a device for loading products to a predetermined location, by which device products fed from the former process at a rate of more than 50 m/min are properly trued-up.

A further object of the present invention is to provide a device for loading products to a predetermined location by which device products are trued-up and bundled in a predetermined number.

According to the present invention, there is provided a device for loading products comprising a frame, a stopper, a threaded column, drive means for rotating the threaded column, and a supply means for supplying the products to the threaded column. In this device, the stopper is provided along a path through which the products are fed to the predetermined location, and the ends of the products are engaged with the stopper. The threaded column is supported in the frame and rotates in such a manner that the upper surfaces thereof move clockwise in a direction toward the stopper, i.e., the threaded column has external screw threads that turn in the direction of the predetermined location when the threaded column rotates. The portion between the screw threads receives the product and urges the product along by frictional force from the rotation of the threaded column until the end of the product butts against the stopper. This portion also feeds the product toward the predetermined location while urging the end of the product to abut against the stopper. The product is supplied by the supply means in such a manner that it is engaged with the portion between the screw threads.

A means for bundling a predetermined number of products is also provided.

BRIEF DESCRIPTION OF THE DRAWINGS

The present invention will be better understood from the ensuing description made, by way of example, of the embodiments of a device for loading products to a predetermined location according to the present invention with reference to the accompanying drawings, wherein.

DESCRIPTION OF THE PREFERRED EMBODIMENTS

The present invention will now be described with reference to prefer embodiments of the invention.

Figure 1:
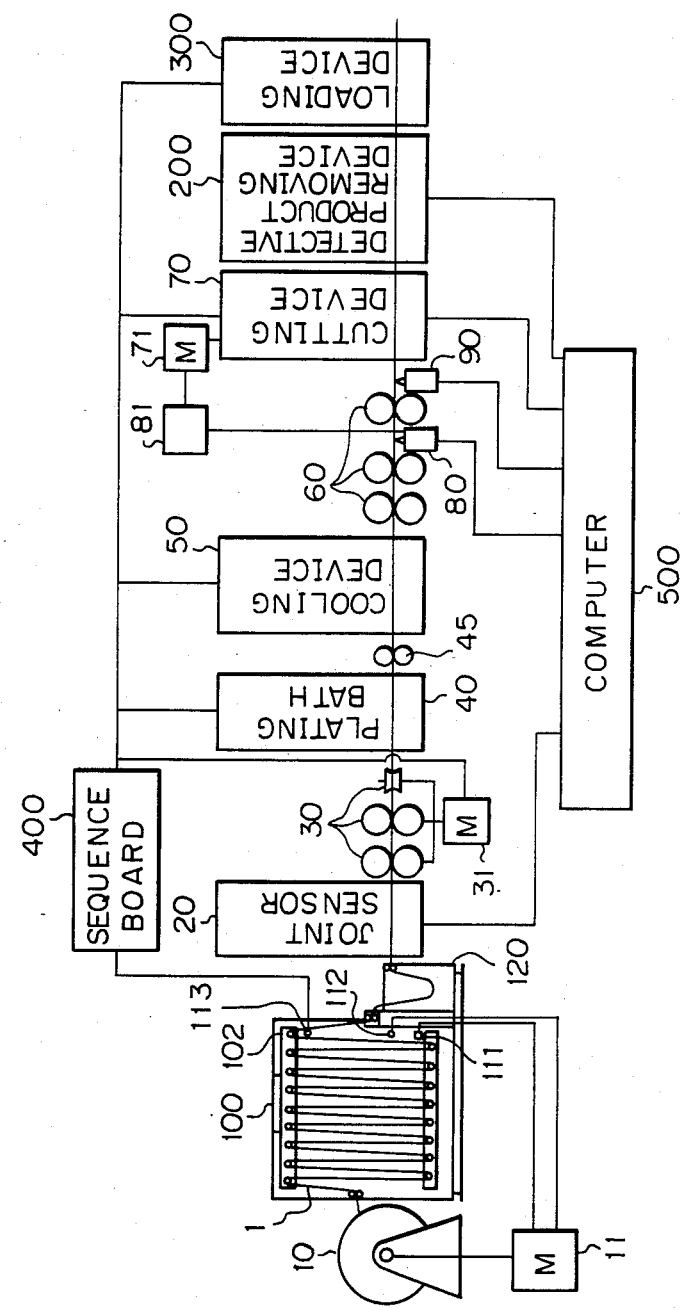
FIG. 1 is a diagram of a tube manufacturing system wherein an embodiment according to the present invention is applied.

FIG. 1 is a diagram of a tube manufacturing system. Referring to the Figure, an uncoiler 10 holds a thin belt-shape material 1 in a coil-wound state, and is driven by a motor 11 so that the material 1 is fed to each processing device. An accumulator 100 temporarily holds the material 1 supplied from the uncoiler 10, and feeds a necessary quantity of material 1 to the next processing device. A joint sensor 20 senses a joint made by welding the finishing end of the material 1 to the starting end of a new coil of material 1, thus ensuring a continuous production of products. The new material 1 is mounted on a replacement uncoiler 10, which is substituted for the empty uncoiler 10 at an appropriate point in the operations. The product which includes this joint will be removed as a defective product by a removing device 200, as described later.

A forming roll 30 consisting of a plurality of pairs of rollers is driven by a motor 31, and thus the flat material 1 is formed into a channel-shape, and the channel-shaped material is then formed into a flat pipe-shape. The material 1 formed into a pipe-shape is then immersed in a plating bath 40 to be plated, and is then fed by feed rollers 45 into a cooling device 50 in which it is sprayed with water to be cooled. The material is then fed to a cutting device 70 by feed rollers 60, and during its passage along this section of the path, the speed of travel of the material 1 is measured by a velocity sensor 80, and a defective product sensor 90 senses whether or not the shape of the material 1 is correct. This defective product sensor 90 is a noncontact type sensor which checks the width or minor axis of the flat pipe-shaped material 1 by the amount of eddy-current loss recorded.

The cutting device 70 includes a cutter for cutting the material 1 into tubes having a predetermined length, and a pulse motor 71 driving the cutting device 70 is driven by output pulses from a pulse encoder 81 connected with the velocity sensor 80. The defective product removing device 200 removes defective tubes after they have been cut by the cutting device 70. Tubes considered to be defective are, for example, those having a welding joint sensed by the joint sensor 20, those which have been immersed for too long a time in the plating bath 40, and those having an incorrect shape sensed by the defective product sensor 90. The non-defective tubes are made into bundles containing 150 tubes by, for example, a loading device 300, and the bundled tubes are fed to the next processing device. In the above device, the elements described are controlled and driven by a sequence board 400 and a computer 500.

Figure 2:
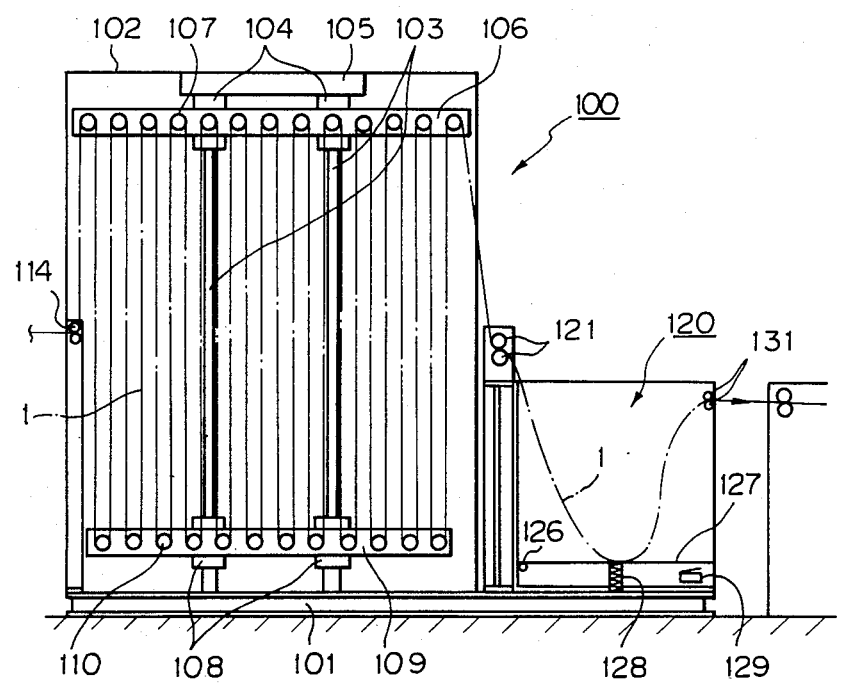
FIG. 2 is a front view of an accumulator.
Figure 3:
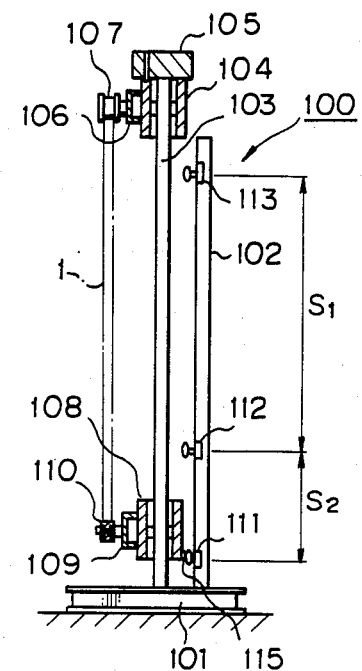
FIG. 3 is a side view of the accumulator.
Figure 4:
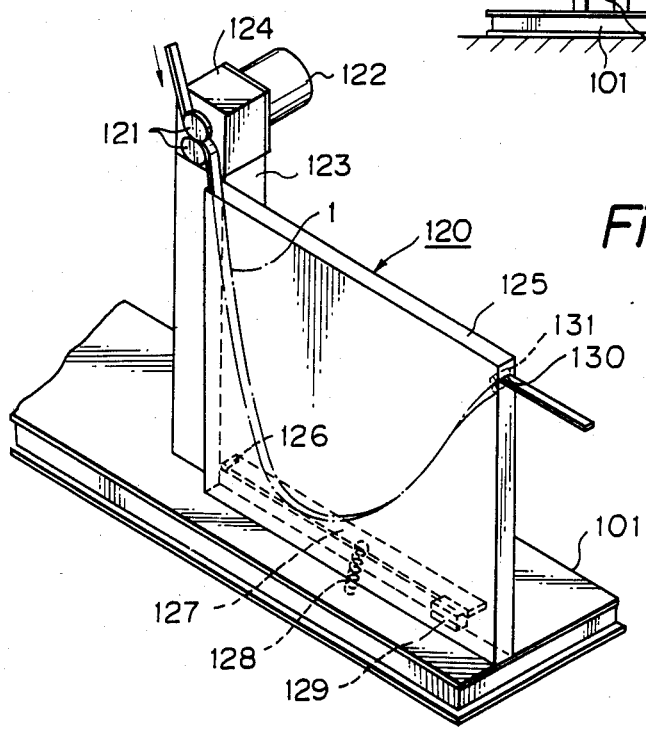
FIG. 4 is a perspective view of a substocker.

FIGS. 2 through 4 show the accumulator 100 and a substocker 120. A plate-shaped fixed frame 102 and a pair of guide rods 103, 103 are disposed on a base 101; the guide rods 103 being located in front of the fixed frame 102 and in parallel with each other. Cylindrical fixed holders 104, 104 are fitted on the upper ends of the guide rods 103, 103, respectively, and are connected to each other by a plate 105. A fixed bridge 106 is horizontally mounted on the cylindrical fixing holders 104, 104 and a plurality of rollers 107 are pivotally mounted on the front surface of the bridge 106 at constant intervals. These rollers 107 are standing blocks. On the other hand, cylindrical movable holders 108, 108 are slidably fitted on the lower portions of the guide rods 103, 103, respectively, and a movable bridge 109 is horizontally mounted on these movable holders 108, 108. A plurality of rollers 110 are pivotally mounted on the front surface of the movable bridge 109 at constant intervals, similar to the plurality of rollers 107 mounted on the fixed bridge 106. The rollers 110 are movable blocks, and thus the movable bridge 109 can move up and down along the guide rods 103, 103.

A pair of inlet rollers 114 are rotatably supported on an end portion of the fixed frame 102, this end portion being situated on one side of the uncoiler 10, and first, second, and third limit switches 111, 112, 113 are attached to the fixed frame 102, at positions near to the guide rods 103, 103. Note, these limit switches 111, 112, 113 are shown on the right end of the fixed frame 102 in FIG. 1 for simplicity. These limit switches 111, 112, 113 are engagable with a projection 115 provided on a rear surface of the movable holder 108, as shown in FIG. 3, and send a signal to the motor 11 or the sequence board 400 when engaging with the projection 115 of the movable holder 108.

As shown in FIG. 3, the first limit switch 111 is disposed at the lowest position among the limit switches, 111, 112, 113 and this first limit switch 111 sends a stop signal to the motor 11 to stop the uncoiler 10 when the projection 115 of the movable holder 108 engages with the first limit switch 111. The second limit switch 112 is disposed above the first limit switch 111 by a distance $S_2$, and this second limit switch 112 sends a start signal to the motor 11 to start the uncoiler 10 when the projection 115 of the movable holder 108 engages with the second limit switch 112. The third limit switch 113 is disposed above the second limit switch 112 by a distance $S_1$, and this third limit switch 113 sends a stop signal to the sequence board 400 to stop the tube manufacturing system when the projection 115 of the movable holder 108 engages with the third limit switch 113.

The material 1 held by the uncoiler 10 is fed through the inlet rollers 114, (FIG. 2) and is passed alternately over the rollers 107 of the fixed bridge 106 and the rollers 110 of the movable bridge 109, in such a manner that the material is led straight up and down, and is then fed into a pair of feed rollers 121. The feed rollers 121 are provided at an inlet portion of the substocker 120, (FIG. 4) which is disposed to one side of the fixed frame 102 on the base 101, and is driven by a motor 122 to feed the material 1 from the accumulator 100 to the next process.

The feeding rollers 121 are rotatably supported at the upper portion of the support member 123, and are driven by the motor 122 through a reduction gear 124. The material 1 fed by the feeding rollers 121 is taken into a casing 125. The casing 125 has a lever 27 rotatably supported by a pin 126 in the lower portion of the casing 125; a spring 128 and a limit switch 129 being provided under the lever 127. The spring 128 biases the lever 127 upward, so that the lever 127 releases the limit switch 129 when only a relatively small quantity of material 1 rests on the lever 127. An opening 130 for passing the material 1 therethrough is provided at the outlet side of the casing 125, with a pair of rollers 131 being provided inside the opening 130.

The motor 122 rotates when the limit switch 129 is in the OFF condition, to rotate the rollers 121, 121. The substocker 120 allows the material 1 to sag inside the casing 125. Thus, when the quantity of sag in the material 1 is small, so that the weight of the material 1 acting on the lever 127 is light, the lever is located at a relatively upper position by the spring 128 and the limit switch 29 is turned OFF, and accordingly, the rollers 121 rotate to feed the material 1 into the casing 125. If the quantity of the material 1 acting on the lever 127 is increased by the operation of the roller 121, the lever 127 is pulled downward against the spring 128 by the weight of the material 1, and the limit switch 129 is turned ON. As a result, the motor 122 is stopped, and thus the rollers 121 stop feeding the material 1 into the casing 125.

Thus, the substocker 120 always allows a certain amount of sag in the material 1, so that the material 1 fed to the forming rollers 30 is not under a high tension.

As shown in the above description, according to this embodiment, the material 1 is fed from the accumulator 100, which controls the amount of the material 1 held therein by the descent and ascent of the moving bridge 109. When the moving bridge 109 is located between the first and second limit switches 111, 112, and the feeding rollers 121 are driven and the motor 11 of the uncoiler 10 is stopped, the material 1 is only discharged from the accumulator 100, so that the moving bridge 109 continues to move upward. When the projection 115 of the moving holder 108 engages with the second limit switch 112, the motor 11 of the uncoiler 10 is started and the uncoiler 10 supplies the material 1 to the accumulator 100 at a speed higher than the feeding rate at which the feed rollers 121 are feeding the material 1 into the casing 125. As a result, the moving bridge 109 descends little by little, and the projection 115 on the moving holders 108, 108 engages with the first limit switch 111. This engagement of the projection 115 with the first limit switch 111 causes the motor 11 of the uncoiler 10 to be stopped, whereby the feeding of the material 1 from the uncoiler 10 is stopped and the moving bridge 109 starts to move upward again. Under normal conditions, the above operations are repeated; that is, the moving bridge 109 moves up and down between the first and the second limit switches 111 and 112. In this case, the maximum fluctuating amount of the material 1 is equal to a product obtained by multiplying the number of turns of the material 1 held between the rollers 107 and 110 by $S_2$.

When the material 1 held in the uncoiler 10 is used up, the material 1 is no longer fed to the accumulator 100 even if the motor 11 is switched on by the action of the second limit switch 112. On the one hand, as the material 1 is still fed from the accumulator 100 by the feeding rollers 121, the moving bridge 109 ascends above the second limit switch 112, and until the moving bridge 109 moves upward to engage with the third limit switch 113, the material 1 can be fed out by the amount which is a product obtained by multiplying the number of turns of the material 1 held between the rollers 107 and 110 by $S_1$. During this time, an operator can exchange the coil of the material 1 for a new coil of material at the uncoiler 10, and join the starting end of the new material 1 to the finishing end of the old material 1 by welding. The operator then marks the joint portion of the material 1 with, for example, a pen. If an emergency condition should occur, i.e., the moving bridge 109 engages with the third limit switch 113 before completion of the welding, the tube production line is stopped by the sequence board 400 through a signal from the limit switch 113. As a sufficient distance is provided between the second and the third limit switches 112 and 113, in normal operation the replacement of the material 1 is usually concluded before the moving bridge 109 engages with the third limit switch 113. Therefore, the operational availability of the system is raised by between 12 and 15%, compared with a conventional system.

Preferably, a photocell is provided near the uncoiler 10 and a clamp is provided near the inlet rollers 114, 114. The photocell senses the diameter of the coil of the material 1 to determine the quantity of material remaining on the uncoiler 10. When the photocell detects that the material 1 is coming to an end, the clamp holds the finishing end of the material 1 and the motor 11 is stopped. An operator then welds the starting end of the new material to the finishing end of the old material, and marks the joint portion of the material with, for example, a pen.

The defective product removing device 200 is constructed as follows.

Figure 5:
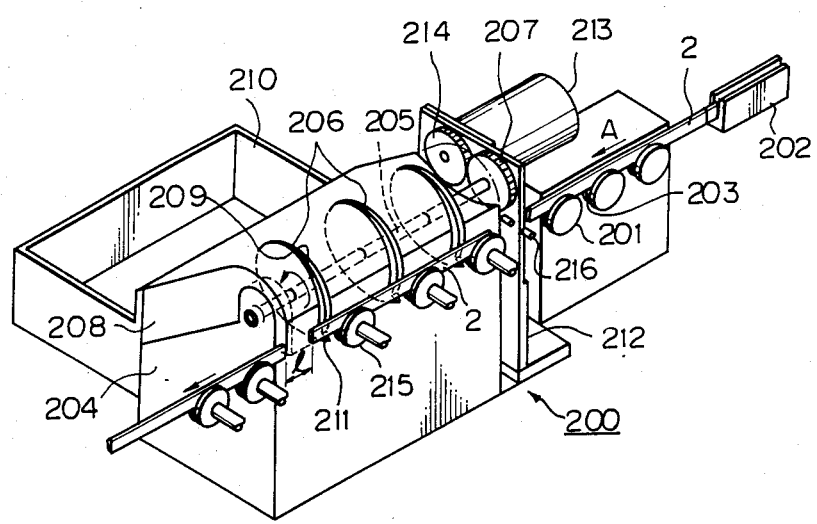
FIG. 5 shows a defective product removing device of an embodiment according to the present invention.

FIG. 5 shows an external view of the defective product removing device 200. In this removing device 200, accelerating rollers 201 are rotated by a driving mechanism (not shown) to accelerate a tube 2 in the direction shown by the arrow A. The tube 2 fed through a guide member 202 has been cut to a predetermined length by the cutting device 70, which is disposed adjacent to and upstream of the removing device 200. The tube 2 is engaged with outer grooves 203 of the accelerating rollers 201 to be accelerated and thus separated from the succeeding tube. Note that the tangential velocity of the accelerating rollers 201 is about 1.5 times the feed rate of the tube 2 passing through guide member 202.

Three disks 206 are fixed to a shaft 205 rotatably supported in a supporting frame 204, and a gear 207 is provided at one end of the shaft 205. A motor 213 is mounted on a supporting plate 212 disposed near the supporting frame 204, and a gear 214 is fixed on an output shaft of the motor 213 to engage with the gear 207 of the shaft 205, so that the disks 206 rotate when the motor 213 is driven. Note, a photocell 216 is used to sense a gap between two successive tubes 2, and the disks 206 can not rotate until the photocell 215 senses the gap and sends a signal to the computer 500, which then sends a rotation-allowed signal to the motor 213.

A cover 208 is provided at the opening of the supporting frame 204 and is formed with three slits 209, so that peripheries of the three disks 206 project through the slits 209, respectively. The upper surface of the cover 208 inclines to a collecting box 210 provided behind the supporting frame 204, so that a defective tube 2 can be smoothly guided into the collecting box 210. Each disk 206 is provided with a claw 211 at the periphery thereof, respectively, and the claws 211 are adjusted so that they are all located at the same height. When not in operation, the claws 211 are located at a position at which they will be engaged with an under surface of a tube 2. The motor 213 rotates only when a defective tube 2 rests on the claws 211, so that the defective tube 2 is trapped by the claws 211, lifted and slid along the upper surface of the cover 208, and then dropped into the collecting box 210. Note, the number of the claws 211 provided on one disk 206 may be more than two, although only one claw is shown in this embodiment, and the rotating angle of the output shaft of the motor 213 must be adjusted in accordance with the number of the claws 211.

Three carrying rollers 215 are provided near the disks 206, the tangential velocity of the carrying rollers 215 being substantially equal to the tangential velocity of the accelerating rollers 201, so that the carrying rollers 215 feed the tube 2 at the same rate as that of the accelerating rollers 211.

The defective tubes 2 removed by the removing device 200 are those detected by the joint sensor 20, the velocity sensor 80, and the defective product sensor 90. The computer 500 decides whether or not the defective tube 2 detected by the sensors is to be removed by the removing device 200.

The joint sensor 20 senses a weld joint portion of the material 1, the joint portion being optically detected by an optical sensor which senses a mark made by an operator after welding. The velocity sensor 80 has a roller which is rotated by contact with a tube, and thus the feed rate of the tube 2 is sensed by determining the rotational speed of the roller. If the velocity sensor 80 senses that the tubes 2 have stopped, then it determines that the tubes 2 have been immersed in the plating bath 40 for too long a period, i.e., more than the allowable period, and thus the plating of the tubes 2 must be regarded as defective. The defective product sensor 90 is an eddy-current flow detector which detects the exterior form of the tubes 2 by the amount of eddy-current loss recorded, as described above, and detects whether or not the width of a tube 2 is a predetermined size.

Thus, if a defective tube 2 is detected by any one of the sensors 20, 80, and 90, a signal denoting the presence of a defective tube 2 is input to the computer 500. The computer 500 has a shift register for controlling the removal of a defective tube 2. This shift register is, for example, a 16 bit memory as shown in FIG. 6, and is constructed in such a manner that "1" is set in the first bit when a defective tube 2 is detected by the joint sensor 20, "1" is set in the eighth bit when a defective tube 2 is detected by the velocity sensor 80, and "1" is set in the twelfth bit when a defective tube 2 is detected by the defective product sensor 90.

The content of the register is controlled in such a manner that it is shifted to a higher position by one bit every time one tube 2 passes through, for example, the photocell 216. In FIG. 6, reference symbols "a", "b", "c", and so on, represent a transition of time. In the example shown in FIG. 6, "1" is set in the first bit as the joint sensor 20 detects a defective tube 2 at the time "a", and this "1" is shifted to the second bit at the time "b" when one tube 2 has passed through the photocell 216. Similarly, the content in the register is shifted by one bit every time each tube 2 moves along the path by the length of one tube 2. At the time "d", "1" is set in the twelfth bit as the defective product sensor 90 detects another defective tube 2. At the next time "e", the "1" showing defective tubes 2 which already have been detected are shifted, and a new "1" is set in the first bit; which means that the joint sensor 20 has detected another defective tube 2. The content of every bit is then uninterruptedly shifted one by one.

Figures 6, 7:
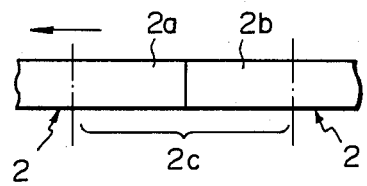
FIG. 6 shows a content of a shift register.
FIG. 7 is a view of tubes showing the construction of a section for sensing a defective tube.

The signal "1" does not mean that a specific tube 2 has a defect, but that there is a defect in either the trailing half 2a of a leading tube 2 or the leading half 2b of a trailing tube 2, as shown in FIG. 7. That is to say, when a portion 2c composed of the trailing half 2a and the leading half 2b includes a defect, "1" is set in a predetermined bit. This is because a measuring error for a defective tube 2 and a calculating error by the computer are taken into consideration. Therefore, the removing device 200 takes out the two tubes 2 as defective products, and discharges them into the collecting box 210. Namely, a command signal (as described previously) for rotating the disks 206 of the removing device 200 is output when "1" is set in either the fourteenth bit or the fifteenth bit of the shift register. In the example shown in FIG. 6, at the time "f", the preceding tube 2 detected by the defective product sensor 90 is taken out at the time "d", and at the time "g", the following tube 2 detected by the defective product sensor 90 is taken out. At the time "n", the preceding tube 2 detected by the joint sensor 20 is taken out. Thus, a defective tube 2 and a tube 2 which may be defective are removed from the production line of the tube manufacturing system.

In the shift register, the bit to be set at '1' when a defective tube is detected is decided by a product which is obtained by dividing the distance D between the sensor detecting a defective tube 2 and the removing device 200 by the length L of the tube 2. For example, when handling tubes 2 longer than tubes 2 in the above case, if the joint sensor 20 detects a defective tube 2, "1" is set in the second bit or the third bit.

Note, the sensors for detecting a defective tube 2 may be located anywhere in the production line, and the number of sensors used is not restricted.

Figure 8:
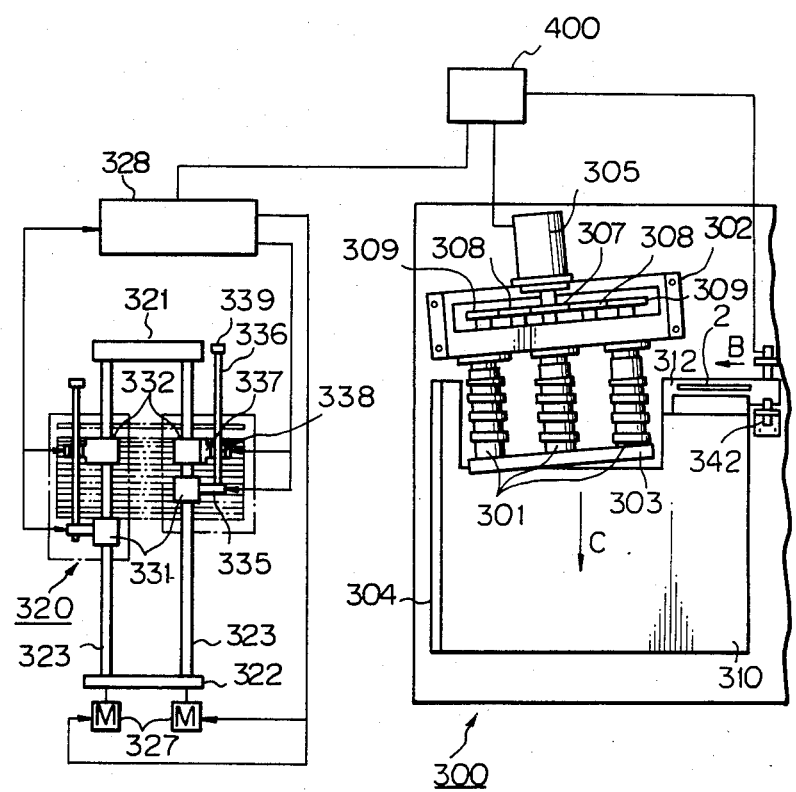
FIG. 8 is a plan view of a loading device.
Figure 9:
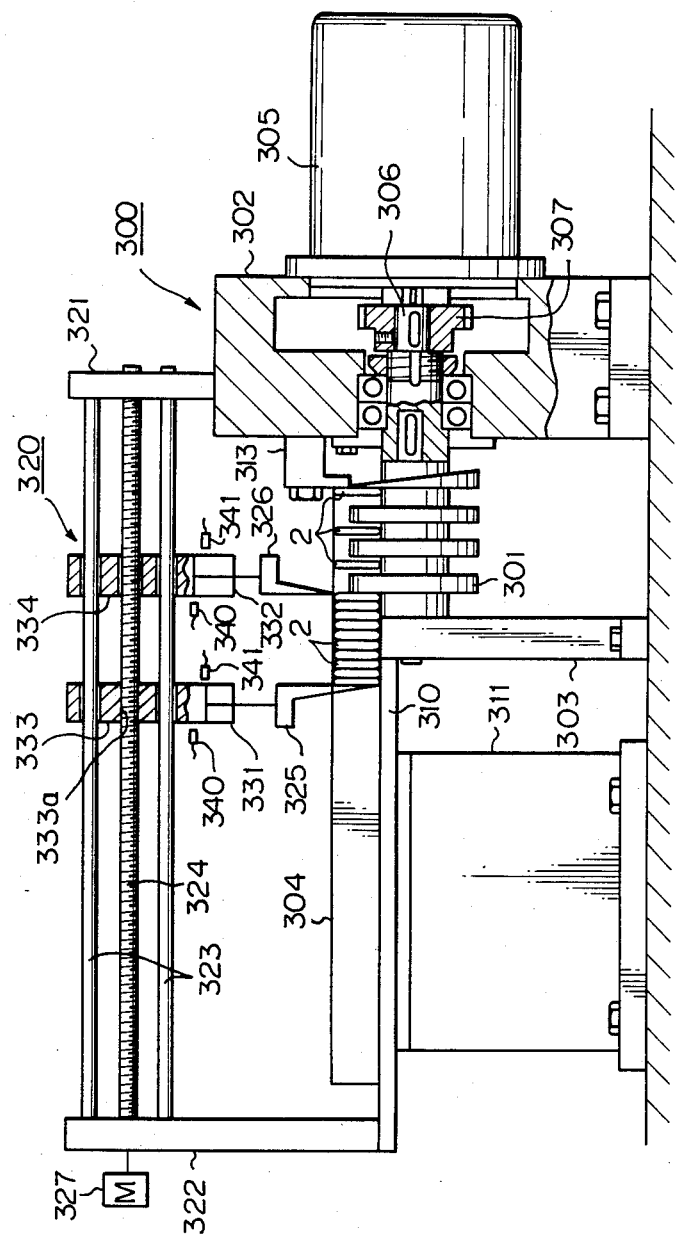
FIG. 9 is a side view of the loading device, partly in cross section.

As mentioned above, the removing device 200 removes a defective tube 2 from the production line, so that only defect-free tubes 2 are fed to a loading device 300. FIGS. 8 and 9 show the loading device 300. In these drawings, the tubes 2 are fed to the loading device 300 through the removing device 200 along the path shown by the arrow B, and are then transported further in the direction of the arrow B by the loading device 300. During this transportation, the tubes 2 are made into bundles containing, for example, 150 tubes, and the bundled tubes are sent to a predetermined location.

In the loading device 300, three threaded columns 301 are rotatably supported in a fixed frame 302 and a support frame 303 in such a manner that they are disposed in parallel with each other. These threaded columns 301 all have an external screw thread having the same pitch, and rotate in such a manner that the upper surfaces of the column 301 move clockwise in a direction toward stopper 304 provided on the side of the loading device 300 opposite to the removing device 200, so that a tube 2 entering from the removing device 200 is moved by the columns 301 toward the stopper 304 and is then advanced in the direction of the arrow C. The columns 301 are disposed in such a manner that the screw threads are aligned in parallel to the direction of the arrow B.

A motor 305 for driving the columns 301 is mounted on the fixed frame 302, and the output shaft 306 of the motor 305 is coaxially connected to the column 301 which is the center column of the three columns 301. The motor 305 is constructed in such a manner that it is rotated in synchronization with a signal from a photocell 342, which outputs the signal when it senses a gap between two successive tubes 2. A drive gear 307 is fitted to the output shaft 306, and is connected to gears 309, 309 fixed to the columns 301 and 301 on each side of the center column 301 through idling gears 308 and 308. Therefore, when electric power is supplied to the motor 305 by the sequence board 400, the motor 305 rotates and thus the three columns 301 rotate in the same direction at the same number of revolutions.

A table 310 is provided on a stand 311, and supports the under surface of the tube 2 fed by the columns 301. A conveyer 312 is disposed on the removing device 200 side of the table 310, and this conveyer 312 carries the tube 2 in the direction of arrow B. A guide plate 313 is fixed to the fixed frame 302, and is disposed above the conveyer 312 to guide the tube 2 along the direction of arrow B. The stopper 304 is provided on a portion of the table 310 located at the side opposite to the conveyer 312, the stopper 304 being formed in parallel to the direction of arrow C. Therefore, the tube 2 sent by the conveyer 312 is received by the columns 301 and engated with a portion between the screw threads of the threaded columns 301, and thus the tube 2 is moved toward the stopper 304 and simultaneously fed in the direction of arrow C. The ends of the tubes 2 butt against the stopper 304 while being fed by the columns 301, so that all the ends of the tubes are exactly trued up by the time the tubes 2 are received by the table 310.

FIGS. 8 and 9 show holders 320 provided above the table 310. The holders 320 bundle a predetermined number of tubes. In FIG. 8, the holders 320 are shown on the left side of the table 310 for simplicity.

In FIGS. 8 and 9, a pair of support members 321 and 322 are provided on an end portion of the fixed frame 302 and an end portion of the table 310, respectively, and support the ends of four guide rods 323 and two driving threaded rods 324. One of the driving rods 324 drives one of the pairs of the claws 325 and 326 in the direction of arrow C, and the other driving rod 324 drives another pair of claws 325, 326 along the direction of arrow C. The two guide rollers 323 and 323 are disposed on the upper and lower sides of the driving rods 324, respectively, in such a manner that they are parallel to each other and guide the movement of the claws 325 and 326. Motors 327 are attached to the support member 322 to drive and rotate the driving rods 324. The motors 327 are controlled by a control circuit 328.

The claws 325 and 326 are supported by a first cylinder 331 and a second cylinder 332, respectively, and are driven to and fro by the driving rods 324. The front claw 325 is attached to a piston rod of the first cylinder 331, and the rear claw 326 is attached to the piston rod of the second cylinder 332, and thus the claws 325 and 326 are able to move up and down. The driving rod 324 and the guide rods 323 extend through a support portion 333 of the first cylinder 331, the driving rod 324 being threadingly fitted in a screw hole 333a formed in the support portion 333. The driving rod 324 and the guide rods 323 extend through a support portion 334 of the second cylinder 332. Here, the driving screw 324 is not threadingly fitted in the support portion 334, different to the fitting of the first cylinder 331.

As shown in FIG. 8, an arm 335 extends from a side portion of the first cylinder 331, and a connecting rod 336 parallel to the guide rod 323 is fixed to the arm 335. On the one hand, an arm 337 projecting from a side portion of the second cylinder 332 has a hole 338, and the connecting rod 336 is inserted in the hole 338 and projects therethrough. The tip end of the connecting rod 336 has a flange portion 339 having a diameter larger than the diameter of the hole 338. As will be described later, the number of tubes per bundle is decided by the length of the connecting rod 336. When the first cylinder 331 moves in the direction of arrow C, the second cylinder 332 is stationary until the flange portion 339 engages with the arm 337 of the second cylinder 332, and the first and second cylinders 331 and 332 then move together after the flange portion 339 has engaged with the arm 337.

Sensors 340 and 341 are provided at the sides of the first and second cylinders 331 and 332. These sensors 340, 341 determine whether the pistons of the cylinders 331 and 332 have reached the upper or lower positions where the pistons should stop. Output signals from these sensors 340 and 341 are input to the control circuit 328.

The loading device 300 bundles the tubes 2 in bundles of 150 tubes as follows.

A tube 2 which has passed the removing device 200 is fed to the conveyer 312 and received by the columns 301. A gap formed between the tube 2 and a succeeding tube 2 is sensed by the photocell 342, and a signal is sent to the motor 305 to drive the screw 301 to rotate by one turn. The tube 2 is urged along by frictional force from the rotation of the threaded columns 301 until the end of the tube 2 butts against the stopper 304. After the succeeding tube 2 has passed the photocell 342, the columns 301 again rotate by one turn. By repeating the above action, the tubes 2 are fed in the direction of arrow C by one pitch of the screw thread of the columns 301, so that the respective ends of the tubes are guided by the stopper 304 until they are true with each other.

The front claw 325 then engages with a front face of the tube located at the head, and is moved in the direction of arrow C by the motor 327 and the driving screw 324. The front claw 325 intermittently advances in synchronization with the rotation of the columns 301 in such a manner that the pitch of the front claw 325 is less than the pitch of the columns 301, and thus the tubes are accumulated at the front claw 325. During this action of the front claw 325, the rear claw 326 is located above the tubes 2. After the predetermined number of tubes 2 have been fed to the front claw 325, the rear claw 326 descends to support a back face of the last tube 2. The instant that the rear claw 326 engages with the last tube 2, the flange portion 339 engages with the arm 337 of the second cylinder 332. Therefore, the front claw 325 is advanced by the rotation of the driving rods 324, so that the rear claw 326 supported by the second cylinder 332 advances together with the front claw 325, and thus the predetermined number of tubes 2 are fed in a bundle. Note, the number of bundled tubes depends upon the length of the connecting rod 336.

During the operation of one pair of claws 325 and 326, the other pair of claws, which do not feed tubes, wait at the side of the columns 301 for feeding the next bundle of tubes. Thus, two pairs of claws alternately feed the tubes 2, and the control of the claws for up and down movement is carried out by the control circuit 328 activated by the sensors 340 and 341.

As the tubes are bundled by the above described operation, the ends of the tubes are exactly trued up, and these ends will not become irregular even if the tubes are fed at a rate of more than 50 m/min.

Although embodiments of the present invention have been described herein with reference to the attached drawings, many modifications and changes may be made by those skilled in this art without departing from the scope of the invention.

We claim:

1. A device for loading products to a predetermined location comprising:
   a frame,
   a stopper provided along a path through which the products are fed to the predetermined location, the ends of the products being engagable with said stopper,
   a threaded column supported in said frame and rotating in such a manner that the upper surfaces thereof move clockwise in a direction toward said stopper, said threaded column having external screw threads turning in a direction toward the predetermined location when side threaded column rotates, the portion between said screw threads receiving the product to urge the product along by frictional force from the rotation of said threaded column until the end of the product butts against said stopper, said portion feeding the product toward the predetermined location while urging the end of the product against said stopper,
   means for rotating said threaded column,
   means for supplying the product to said threaded column in such a manner that the product is engaged with the portion between said screw threads, said supply means being provided on the opposite side of said threaded column to said stopper, and
   means for bundling a predetermined number of products, said bundling means including:
   at least a front claw and a rear claw, and
   means for moving said claws up and down relative to the predetermined location and to and fro relative to said stopper, in such a manner that such front claw moves forward to a lower position and said rear claw is at first stationary in an upper position, and then moves forward to a lower position to operate together with said front claw to engage the products,
   said moving means including a pair of support members, a guide rod, a threaded rod, means for connecting said front and rear claws and means for rotating said threaded driving rod about the axis thereof, said guide rod and said threaded driving rod being supported at said support members in such a manner that said guide rod and said threaded driving rod are disposed in parallel to the surface of the predetermined location, said front claw being moved forward by said threaded driving rod, and said connecting means having delay means connecting said front and rear claws after only said front claw has moved forward a predetermined distance from said rear claw so that said front and rear claws move forward together after the connecting of said claws.

2. A device according to claim 1, wherein said moving means is provided with a first and second cylinders, said first cylinder supporting said front claw in such a manner that said front claw moves up and down, said second cylinder supporting said rear claw in such a manner that said rear claw moves up and down, said first cylinder being threadingly fitted to said threaded driving rod and supported by said guide rod, said second cylinder being supported by said guide rod.

3. A device according to claim 2, wherein said moving means is provided with sensors which sense a position of said front and rear claws to determine whether the pistons of said cylinders have reached the upper or lower positions at which the pistons should stop.

4. A device according to claim 2, wherein said connecting means is a connecting rod parallel to said guide rod, one end of said connecting rod being fixed to said first cylinder and the other end of said connecting rod being formed with a flange which is engagable with said second cylinder, the length of said connecting rod being substantially equal to a total length of the products to be bundled.

5. A device according to claim 1, wherein said rotating means intermittently rotates said threaded driving rod in synchronization with a rotation of said threaded column in such a manner that the pitch of said front claw is less than the pitch of said threaded column so that the products are accumulated at said front claw.

* * * * *